(12) United States Patent
Leeson et al.

(10) Patent No.: US 10,444,438 B2
(45) Date of Patent: Oct. 15, 2019

(54) OPTICAL FIBER CONNECTOR WITH ARTICULATING LINKAGE THAT DOES NOT ROTATE

(71) Applicant: PPC Broadband Fiber Ltd., Framlingham, Woodbridge (GB)

(72) Inventors: Kim Leeson, Ipswich (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 15/887,925

(22) Filed: Feb. 2, 2018

(65) Prior Publication Data

US 2018/0217335 A1 Aug. 2, 2018

Related U.S. Application Data

(60) Provisional application No. 62/454,032, filed on Feb. 2, 2017.

(51) Int. Cl.
*G02B 6/38* (2006.01)

(52) U.S. Cl.
CPC ........... *G02B 6/381* (2013.01); *G02B 6/3833* (2013.01); *G02B 6/3869* (2013.01); *G02B 6/3887* (2013.01); *G02B 6/3893* (2013.01); *G02B 6/3871* (2013.01)

(58) Field of Classification Search
CPC ........ G02B 6/38; G02B 6/381; G02B 6/3833; G02B 6/3869; G02B 6/3871; G02B 6/3887; G02B 6/3893
See application file for complete search history.

(56) References Cited

U.S. PATENT DOCUMENTS

| | | | |
|---|---|---|---|
| 4,951,521 A * | 8/1990 | Jacobson | B23Q 1/0063 29/436 |
| 5,661,843 A | 8/1997 | Rickenbach et al. | |
| 6,424,761 B1 * | 7/2002 | Kordahi | G02B 6/3829 385/100 |
| 6,571,042 B1 * | 5/2003 | Kordahi | G02B 6/4461 385/100 |
| 6,848,834 B1 * | 2/2005 | Roehrs | G02B 6/383 385/59 |
| 7,494,399 B2 * | 2/2009 | Tsai | B24B 5/14 385/78 |
| 8,439,577 B2 * | 5/2013 | Jenkins | G02B 6/381 385/60 |
| 8,577,223 B2 * | 11/2013 | von der Weid | G02B 6/32 398/131 |
| 8,834,037 B2 * | 9/2014 | Wouters | G02B 6/383 385/71 |

(Continued)

OTHER PUBLICATIONS

Jun. 5, 2018 International Search Report issued in PCT/IB2018/000138.

*Primary Examiner* — Andrew Jordan
(74) *Attorney, Agent, or Firm* — Oliff PLC

(57) ABSTRACT

An optical fiber connector sub-assembly optical fiber connector sub-assembly for an optical fiber connector includes a gimbal configured to hold a ferrule at a front portion of the connector. The gimbal is configured to provide articulated relative movement between the front portion of the connector and a rear portion of the connector such that the ferrule is isolated from movement of the rear portion of the connector.

20 Claims, 8 Drawing Sheets

(56) References Cited

U.S. PATENT DOCUMENTS

| | | |
|---|---|---|
| 9,551,842 B2 | 1/2017 | Theuerkorn |
| 10,007,066 B1 * | 6/2018 | Johnson ............... G02B 6/3604 |
| 2002/0097965 A1 * | 7/2002 | Kordahi ............... G02B 6/3829 |
| | | 385/100 |
| 2008/0096468 A1 * | 4/2008 | Tsai ......................... B24B 5/14 |
| | | 451/28 |
| 2010/0215321 A1 * | 8/2010 | Jenkins ................. G02B 6/381 |
| | | 385/78 |
| 2013/0236140 A1 * | 9/2013 | Wouters ................ G02B 6/383 |
| | | 385/71 |
| 2015/0147036 A1 | 5/2015 | Isenhour et al. |
| 2016/0209602 A1 * | 7/2016 | Theuerkorn ......... G02B 6/3887 |
| 2018/0217335 A1 * | 8/2018 | Leeson ............... G02B 6/3887 |

* cited by examiner

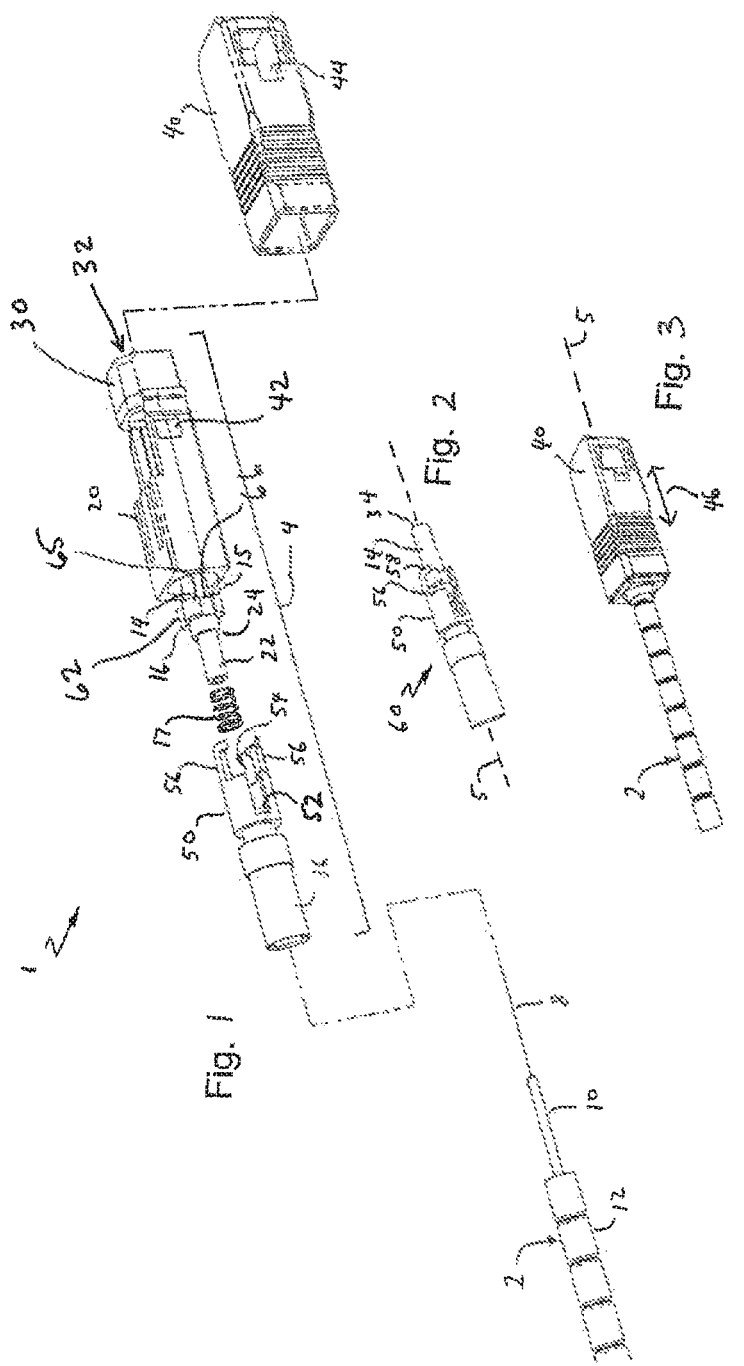

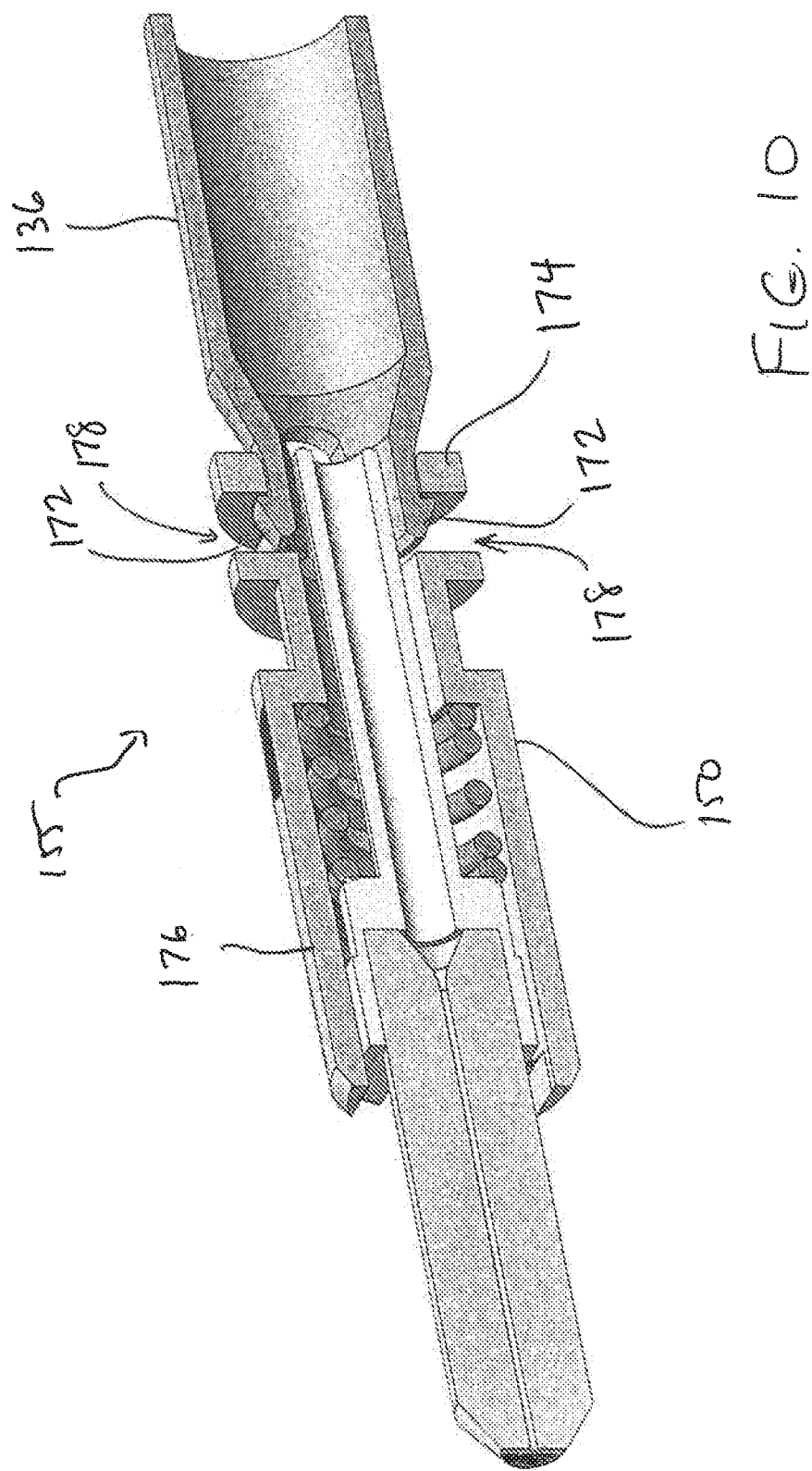

OPTICAL FIBER CONNECTOR WITH ARTICULATING LINKAGE THAT DOES NOT ROTATE

CROSS-REFERENCE TO RELATED APPLICATION

This nonprovisional application claims the benefit of U.S. Provisional Application No. 62/454,032, filed Feb. 2, 2017, the disclosure of which is hereby incorporated by reference herein in its entirety.

BACKGROUND

The present disclosure relates to an optical fiber connector, for example an SC-style connector, and to a method of forming and using such a connector.

The mechanical tolerances involved in terminating single mode optical fiber are much tighter than those for multimode optical fiber. Therefore, while it is quite common for multimode optical fiber be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector plug ready to plug into a matching receptacle. Commonly, eight or twelve single mode optical fibers may be bundled together in an optical fiber cable having an outer protective tube inside of which the optical fibers run.

An example of such a connector is the "Subscriber Connector," or SC connector, originally developed by NTT®. SC connectors have convenient push/pull style mating, and are approximately square in cross-section and with a 2.5 mm diameter ferule at the termination of the optical fiber, surrounded by a plastic housing for protection. SC connectors are available in single or duplex configurations. The SC connector latches into a matching socket in a simple push motion. The push-pull design includes a spring against which the ferrule slides within a plastic inner housing. This arrangement provides a reliable contact pressure at the ferrule end and resists fiber end face contact damage of the optical fiber during connection. The connector can be quickly disconnected by first pulling back an outer housing, which is slidable relative to the inner housing, to disengage a latch inside socket between the socket and the inner housing, before pulling the optical fiber connector from the socket. Until the latch is thus disengaged, the latch prevents withdrawal of the connector when the optical fiber cable is pulled in a direction away from the socket.

A different type of optical fiber connector is the ST type connector, which has a key that prevents rotation of the ceramic ferrule and which connects with a socket using a bayonet lock with an outer shell. All such bayonet type optical fiber connectors are referred to herein for convenience as "ST-type" optical fiber connectors.

An advantage of the SC connector over this type of bayonet connector is that the connector sockets can be more closely packed, as there is no need to get fingers fully around the connector to disengage the connector from the socket.

Other examples of push/pull type connectors are LC connectors or MU connectors. Often, the fiber-end is angled to reduce back reflections and this is usually described by adding APC (Angled Physical Contact) to the name. All such push/pull type optical fiber connectors are for convenience referred to herein as "SC-type" optical fiber connectors. SC-type LC or MU connectors are also known as small form factor connectors, by virtue of having a 1.5 mm diameter ferrule and a plastic housing.

It is important to avoid bending optical fiber around curves having too sharp a bend radius, as this will increase optical losses and can permanently damage the optical fiber. Optical fiber cables are therefore often routed inside a protective outer tube or conduit, which can have minimum bend-limiting properties. Protective bend limiting conduits normally have an outer diameter of 8 mm or 10 mm tubes. The cross-section of a standard SC connector has dimensions of about 7 mm×9 mm, and even a small form factor SC connector is too large to fit inside the inner diameter of a typical protective conduit.

Conventional optical fiber connectors comprise a rigid pushable structure to allow for limited movement of the connector parts while being pushed down stretches of duct. However, due to their rigid structure, conventional optical fiber connectors suffer from signal degradation when weight is added to the cable and the connector while the connector is transmitting a signal.

It may be desirable to provide an optical fiber connector with improved signal transmission capability. As such, it may be desirable to provide an optical fiber connector with a structure that isolates the front end of the connector from the rear end of the connector such that the ferrule is isolated from movement when the rear end of the connector bends due to weight being added to the rear end.

SUMMARY

In accordance with various aspects of the disclosure,

According to various aspects, an optical fiber connector sub-assembly for an optical fiber connector includes a ferrule configured to hold an optical fiber therein along an axis of the ferrule and a ferrule holder configured to hold the ferrule. The ferrule has an end face at which the optical fiber is terminated, and the ferrule holder includes a base in which the ferrule is configured to be seated. The sub-assembly includes a gimbal that includes a sleeve and a ferrule holder carrier coupled to one another and configured to isolate a front end of the connector from a rear end of the connector such that the ferrule is isolated from movement of the rear end of the connector. The ferrule holder carrier is configured to receive the ferrule holder therein.

In some aspects, the ferrule holder carrier is configured to articulate relative to the sleeve. The sleeve may include a cylindrical portion and two prongs extending from a forward end of the cylindrical portion. The ferrule holder carrier may include a collar at a rearward end and a basket at a forward end, the collar including two slots that extend radially through the collar, and each of the two slots may extend about a portion of the circumference of the collar.

According to various aspects, the two prongs and the two slots are structured and arranged relative to one another such that the prongs are configured to snap into the slots. In some aspects, the prongs and the slots may be disposed symmetrically on the sleeve and the collar, respectively. In some aspects, the prongs are configured to bend radially inward when being inserted into the slots and to return toward an unstressed configuration after being inserted into the slots.

According to various aspects, after the prongs are inserted into the slots, the sleeve is configured to articulate relative to the ferrule holder carrier in an X-axis direction and a Y-axis direction that are perpendicular to each other and to an optical fiber axis.

In some aspects, the ferrule holder and the ferrule holder carrier may be relatively moveable with respect to each other along the ferrule axis between limits defined by an interaction between the ferrule holder carrier and the ferrule holder. A portion of the ferrule may lead to the end face of the ferrule projecting along the ferrule axis away from the ferrule holder carrier.

In various aspects, a spring is provided between the ferrule holder and the ferrule holder carrier and configured such that the projecting portion of the ferrule is spring-biased along the ferrule axis away from the ferrule holder carrier.

According to some aspects, the base of the ferrule holder has a plurality of crenellations that extend circumferentially around the ferrule, the ferrule holder carrier have two arms that extend in an axial direction through the crenellations towards the ferrule, and the two arms include a movement limitation feature that interacts with the ferrule holder base to limit the relative movement of the ferrule holder and the ferrule holder carrier along one direction of movement along the ferrule axis.

The optical fiber connector sub-assembly may be suitable for inclusion in any type of optical fiber connection, for example, an ST-type optical fiber connector. In preferred embodiments of the invention the optical fiber connector sub-assembly is for an SC-type optical fiber connector.

In a preferred embodiment of the invention, the movement limitation feature is one or more projecting fingers at an end of the arms. The arms may terminate with circumferentially extending features that engage with the base to limit the relative movement along the ferrule axis of the ferrule holder away from the receiving portion of the ferrule holder. The movement limitation feature may be one or more projecting fingers that extend in a circumferential direction relative to the axis of the ferrule.

Preferably, the movement limitation feature engages with a side of the crenellations nearest the end face of the ferrule. The crenellations may have alternating radially high and low regions, the movement limitation feature engaging with a radially high region of the crenellations.

The spring may be a coil spring provided between the ferrule holder base and the ferrule holder receiving portion, one end of said spring coil being engaged with a side of the crenellations furthest the end face of the ferrule.

Most preferably, the outermost surfaces of the ferrule holder carrier and ferrule holder, relative to the ferrule axis, lie on a common cylindrical envelope. This help to minimize the size of the sub-assembly in a radial direction, making it easier to insert the sub-assembly down a conduit or to pass the sub-assembly through a restricted space, prior to completing the assembly to create an SC-type optical fiber connector assembly.

The ferrule holder may include a base having a socket in which the ferrule is seated, and a hollow stem that projects axially from the base in a direction away from said projecting portion of the ferrule. The ferrule holder carrier receiving portion then extends around at least a portion of the stem and includes a feature that interacts with the ferrule holder base to limit the relative movement of the ferrule holder and the ferrule holder carrier along one direction of movement along the ferrule axis.

The optical fiber will normally lead to the ferrule through the stem.

The spring may be provided between the ferrule holder base and the ferrule holder receiving portion. The spring may be a coil spring that is concentrically seated around the stem of the ferrule holder.

The optical fiber base may have a plurality of crenellations that extend circumferentially around the ferrule. The ferrule holder carrier can have at least two arms that slidably engage with the crenellations.

The arms may terminate with circumferentially extending features that engage with the base to limit the relative movement along the ferrule axis of the ferrule holder away from the receiving portion of the ferrule holder.

The ferrule holder and ferrule holder carrier may be adapted to be assembled by a press-fitting operation in which the ferrule holder moves along the ferrule axis into the receiving portion of the ferrule holder.

The optical fiber will usually include a length of optical fiber extending away from the ferrule, the ferrule holder and the ferrule holder carrier. This length can be surrounded by a material for protection and/or reinforcement, in which case the ferrule holder carrier advantageously includes means for attaching said cladding to this material.

According to various aspects of the disclosure, a Subscriber Connection (SC)-type optical fiber connector may include an optical fiber connector sub-assembly, an inner housing, and an outer housing, the connector sub-assembly being according to the disclosure, wherein: the inner housing is fixedly connected to the ferrule holder carrier, the inner housing comprising a portion which coaxially extends around said projecting portion of the ferrule to define a receptacle for a socket to receive the projecting ferrule portion; the spring biasing means is provided between the ferrule holder and the ferrule holder carrier so that the projecting portion of the ferrule is spring biased along the ferrule axis towards the receptacle portion of the inner housing; and the inner housing is engaged within the outer housing, the inner housing and the outer housing being relatively moveable with respect to each other along the ferrule axis between limits defined by an interaction between the inner housing and the outer housing in order to provide SC-style push/pull engagement/disengagement with a mating optical fiber socket.

The ferrule housing assembly serves as an inner housing in relation to the outer housing in the provision of the SC-style push/pull engagement/disengagement.

The ferrule is preferably rotationally fixed with respect to the ferrule holder about the ferule axis, with the ferrule holder being rotationally aligned by means of one or more rotational keys with respect to the outer housing so that the rotational orientation of the ferrule with respect to the outer housing can be set during assembly of the connector at one of one or more predefined rotational orientations.

A first rotational key may be provided between the ferrule holder and the ferrule holder carrier. A second rotational key may then be provided between the ferrule holder carrier and the inner housing. The ferrule holder and the ferrule holder carrier may have aligned features which provide a combined rotational key between, on the one hand, the ferrule holder and the ferrule holder carrier, and, on the other hand, the inner housing.

A further rotational key may be provided between the ferrule holder sub-assembly and the outer housing.

The ferrule holder and ferrule holder carrier may be adapted to be assembled by a press-fitting operation in which the ferrule holder moves along the ferrule axis into the receiving portion of the ferrule holder.

The inner housing is adapted to be assembled to the ferrule holder and the ferrule holder carrier by a press-fitting operation in which the inner housing moves along the ferrule axis over the projection portion of the ferrule towards the ferrule holder carrier.

BRIEF DESCRIPTION OF THE DRAWINGS

Embodiments of the invention will now be further described, by way of example only, and with reference to the accompanying drawings, in which:

FIG. 1 is an exploded perspective view of an exemplary prior art SC connector;

FIG. 2 is a perspective view of the optical fiber connector sub-assembly of FIG. 1 when assembled;

FIG. 3 is a perspective view of the SC connector of FIG. 1 when assembled;

FIG. 10 is a perspective cross-sectional view of the optical fiber connector sub-assembly of FIG. 4 when assembled.

DETAILED DESCRIPTION OF EMBODIMENTS

Figure 4:
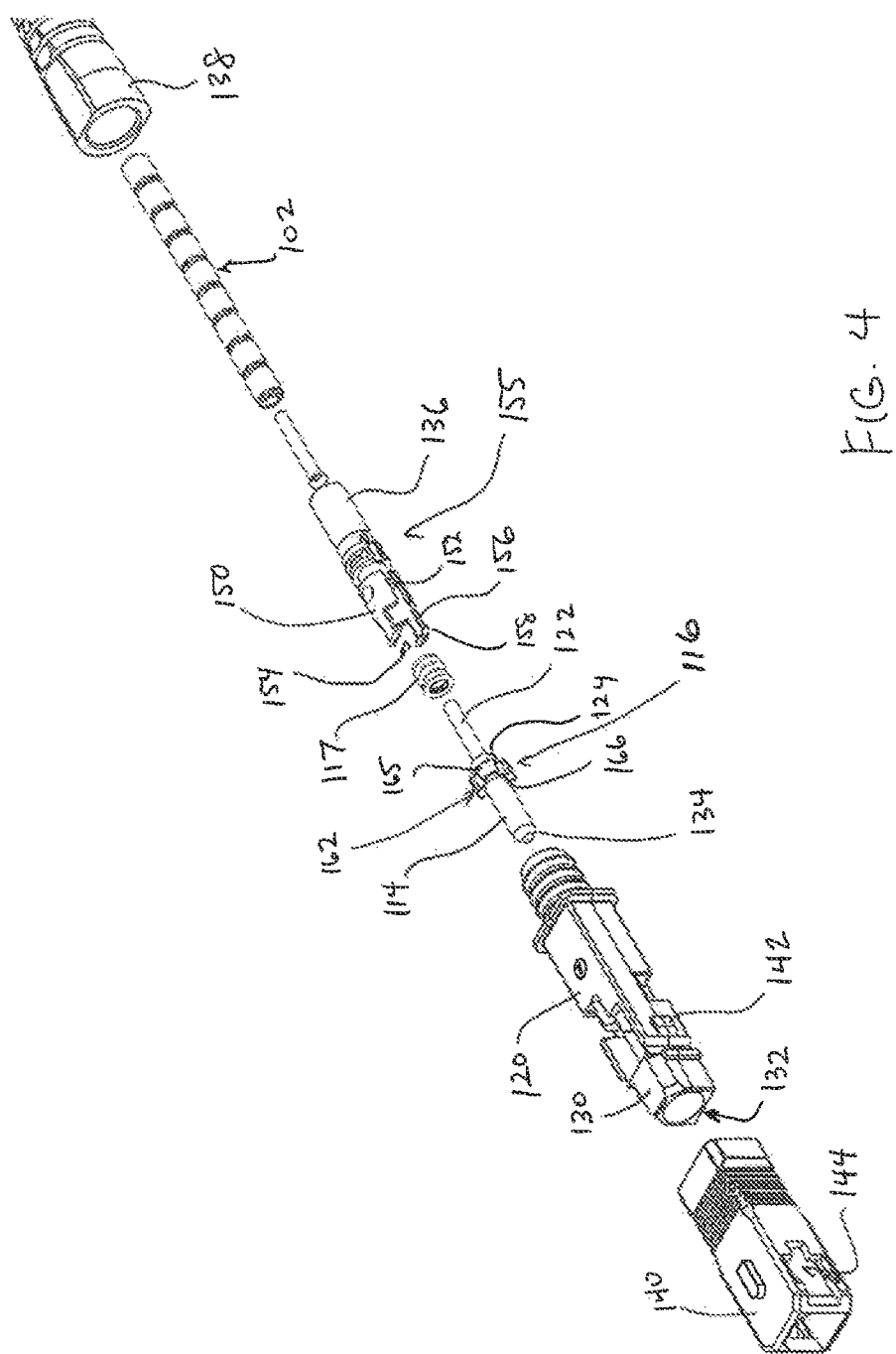
FIG. 4 is an exploded perspective view of an exemplary SC connector in accordance with various aspects of the disclosure.
Figure 5:
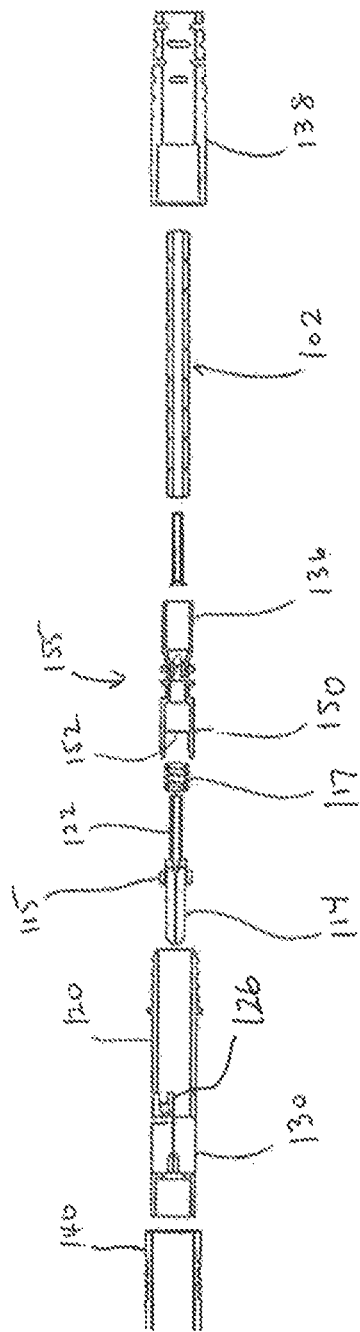
FIG. 5 is an exploded, side cross-sectional view of the optical fiber connector sub-assembly of FIG. 4.
Figure 6:
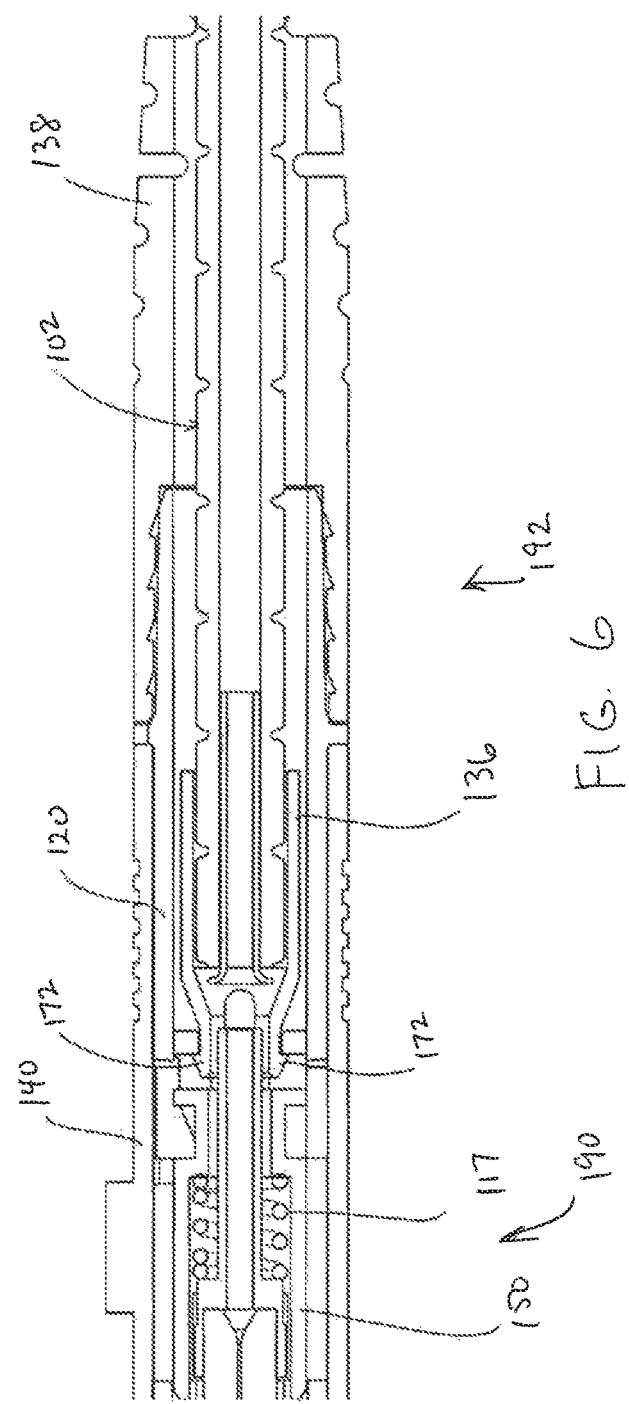
FIG. 6 is a side cross-sectional view of the optical fiber connector sub-assembly of FIG. 4 when assembled.
Figure 7:
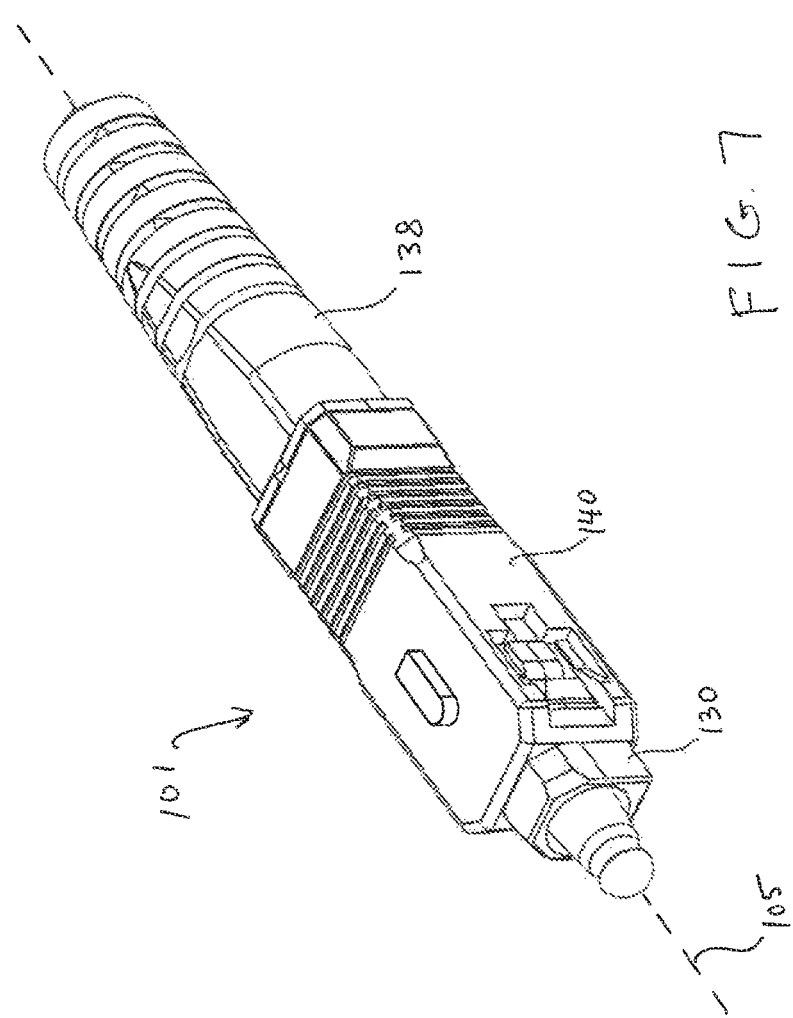
FIG. 7 is a perspective view of the SC connector of FIG. 4 when assembled.
Figure 8:
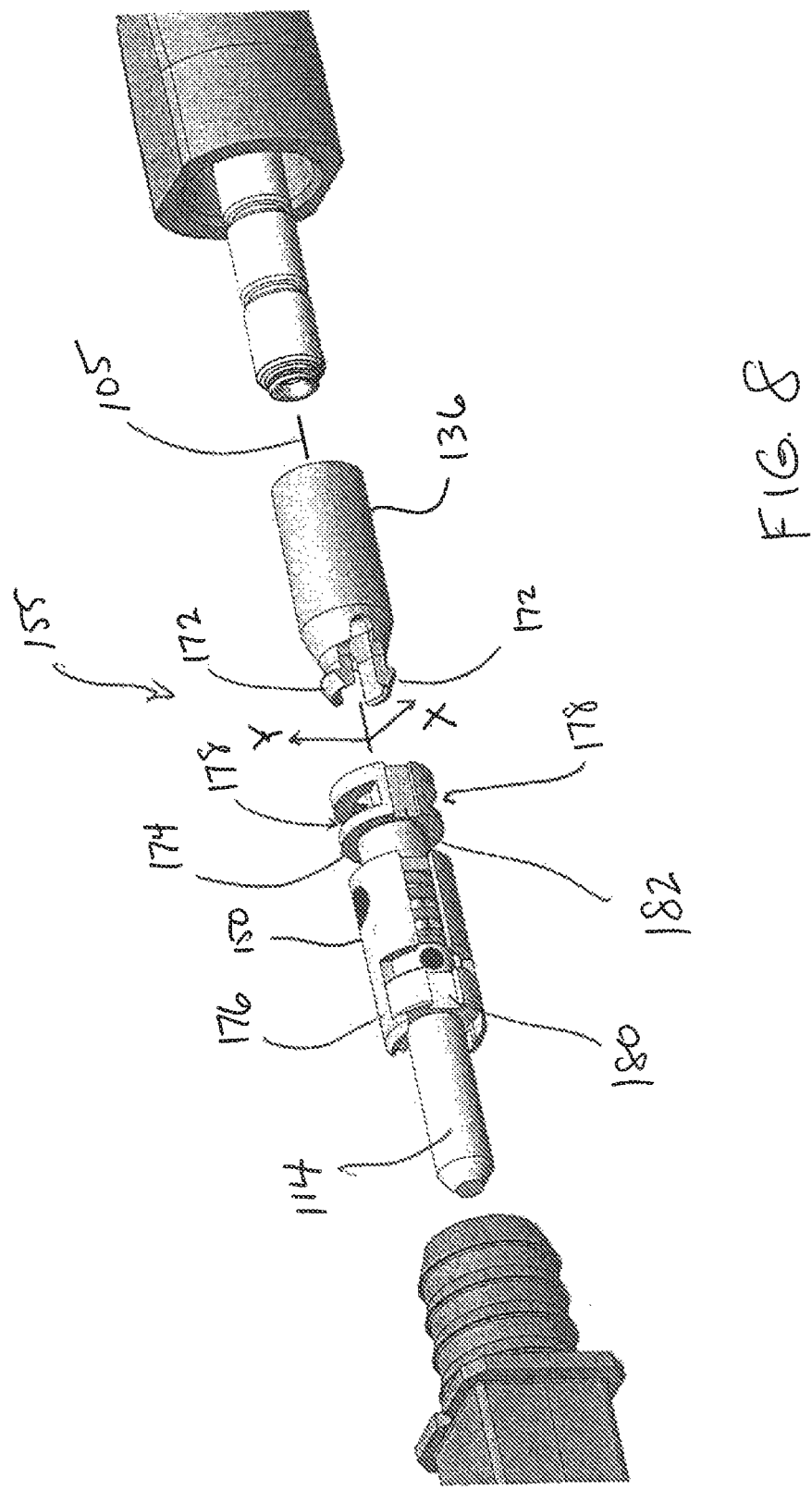
FIG. 8 is an exploded perspective view of the optical fiber connector sub-assembly of FIG. 4.

FIGS. 1 to 3 show an exemplary prior art SC connector, such as the connector disclosed in U.S. Pat. No. 8,439,577, the disclosure of which is incorporated herein by reference. The exemplary SC connector 1 comprises an optical fiber cable 2, a ferrule housing sub-assembly 4, and an outer housing 40 to provide SC-style push/pull engagement/disengagement with a mating optical fiber socket (not shown).

The cable 2 holds a single strand of 125 μm diameter single mode optical fiber 8, protected by primary and secondary buffering layers 10, about 900 μm in diameter and an outer sheath 12, typically 3 mm to 5 mm in diameter. The optical fiber 8 is terminated by the ferrule in a manner well-known to those skilled in the art, and defines a ferrule axis 5 which extends centrally through the SC connector 1.

The ferrule housing sub-assembly 4 includes a cylindrical ceramic ferrule 14, a ferrule holder 16 in which the ferrule is seated, a helical spring 17, a ferrule holder carrier 50, and an inner housing 20. The ferrule holder 16 has a cylindrical stem 22 which extends in an axial direction away from the ferrule 14 towards a sleeve 136 of the ferrule holder carrier 50 used to make a crimp connection around the optical fiber cable sheathing 12. The spring 17 is seated around the stem 22 between an annular shoulder 24 on the ferrule holder 16 and a similar annular surface 52 within a cylindrical recess 54 of the ferrule holder carrier 50. The stem 20 is slidably seated in a closely fitting bore of the ferrule holder carrier 50.

During assembly, the ferrule holder 16 and seated ferrule 14 are inserted axially into the recess 54 of the ferule holder carrier 50. The carrier 50 has a pair of arms 56 around a portion of the stem 22 nearest the ferrule 14 which extend axially forwards of the stem on opposite sides of the base 15 of the ferrule holder. Two pairs of curved fingers 58 are provided, each pair extending in opposite circumferential directions at the end of each arm 56. The fingers 58 extend transversely to the length of the arms 56 partially around the circumference of a portion of the ferrule nearest the base 15.

The ferrule base 15 has four cycles of crenellations 62 spaced symmetrically around the circumference of the base and which provide four corresponding channels that extend parallel to the optical fiber axis 5. These crenellations are in the form of alternating radially high 65 and low 66 cylindrically shaped regions with the circumferential and axial extent of each of the high and low regions being the same. The high and low regions are separated by steps 67 that extend in a radial direction. The arms 56 are seated in opposite radially low regions 66 in a sliding fit with the adjacent high regions 65, and reach axially forward of the base 15 and crenellations 62 so that the fingers 58 engage with the intervening radially high regions 65 on a side 61 of the base 15 opposite the annular surface 24 against which the spring 17 is engaged.

The aforementioned arrangement permits a degree axial movement of the ferrule holder 50, with movement being therefore limited in one direction by the compression of the spring 17 between the two annular surfaces 24, 52 and in the other axial direction by the contact of the fingers 58 with the radially high regions 65 of the crenellations 62 on the base 15 of the ferrule holder 16. As can be seen from the drawings, the ferrule holder base 15 and ferrule holder carrier 50 also have a common cylindrical outer envelope.

The inner housing 20 has a forward portion 30 that coaxially extends around the axially projecting ferrule 14 to define a receptacle 32 for a socket (not shown) to receive a projecting portion of the ferrule 14.

The ferrule holder 116 is free to move backwards inside the ferrule holder carrier 150 and the inner housing 120 when an end face 134 of the ferrule 114 comes into contact with a similar end face (not shown) of another optical fiber ferrule when making an optical connection.

The ferrule holder carrier 50 has a central aperture (not shown) through which the optical fiber 8 and buffering 10 pass, and has in a rear-most portion a sleeve 36 sized to receive and be crimped to the cable sheathing 12. In some aspects, a strain-relief sleeve 38, or boot, may be provided around the junction of the optical fiber cable 2 and the ferrule housing sub-assembly 4.

An outer housing 40 is press-fitted axially over the assembled ferrule housing sub-assembly 4. Once the inner housing 20 and outer housing 40 are engaged together, the inner and outer housings are relatively moveable with respect to each other along the ferrule axis 5 between limits defined by an interaction between the inner housing 20 and the outer housing 40 provided by projections 42 on a pair of opposite sides of the inner housing 20 and a pair of apertures 44 in the outer housing. The projections 42 and apertures 44 interact with sprung features inside a matching socket (not shown) to provide SC-style push/pull 46 engagement/disengagement configured to mate with an optical fiber socket.

FIGS. 4 to 10 illustrate an exemplary SC connector 101 in accordance with various aspects of the disclosure. The SC connector 101 comprises an optical fiber cable 102, a ferrule housing sub-assembly 104, and an outer housing 140 to provide SC-style push/pull engagement/disengagement with a mating optical fiber socket (not shown).

The cable 102 holds an optical fiber 108, for example, a single strand of 125 μm diameter single mode optical fiber, protected by primary and secondary buffering layers 110, about 900 μm in diameter, and an outer sheath 112, typically 3 mm to 5 mm in diameter. The optical fiber 108 is terminated by the ferrule in a manner well-known to those skilled in the art, and defines a ferrule axis 105 that extends centrally through the SC connector 101.

The ferrule housing sub-assembly 104 includes a cylindrical ceramic ferrule 114, a ferrule holder 116 in which the ferrule is seated, a helical spring 117, a gimbal 155, and an inner housing 120. The gimbal 155 includes a sleeve 136 and a ferrule holder carrier 150 coupled to one another such that the ferrule holder carrier 150 is configured to articulate relative to the sleeve 136. The sleeve 136 includes a cylindrical portion 170 and two prongs 172 extending from a forward end of the cylindrical portion 170. The ferrule holder carrier 150 includes a collar 174 at a rearward end and a basket 176 at a forward end.

The collar 174 includes two slots 178 that extend radially through the collar 178, and each of the two slots 178 extends about a portion of the circumference of the collar 174. The two prongs 172 and two slots 178 are structured and arranged relative to one another such that the prongs 172 are configured to snap into the slots 178. In some aspects, the prongs 172 and the slots 178 may be disposed symmetrically on the sleeve 136 and collar 174, respectively. The prongs 172 may be resilient such that the prongs 172 may bend radially inward when being inserted into the slots 178 and return toward their unstressed configured after being inserted into the slots 178.

After the prongs 172 are snapped into the slots 178, the sleeve 136 can articulate relative to the ferrule holder carrier 150 in an X-axis direction and a Y-axis direction that are perpendicular to each other and to the optical fiber axis 105. As a result of this articulation, the gimbal 155 isolates a front end 190 of the connector 101 from a rear end 192 of the connector 101 so that the ferrule 114 is isolated from movement due to bending at the rear end 192 of the connector 101. Thus, the connector 101 is capable of transmitting a better signal when weight is applied to the rear end 192 of the connector 191 that causes bending of the rear end 192.

Figure 9:
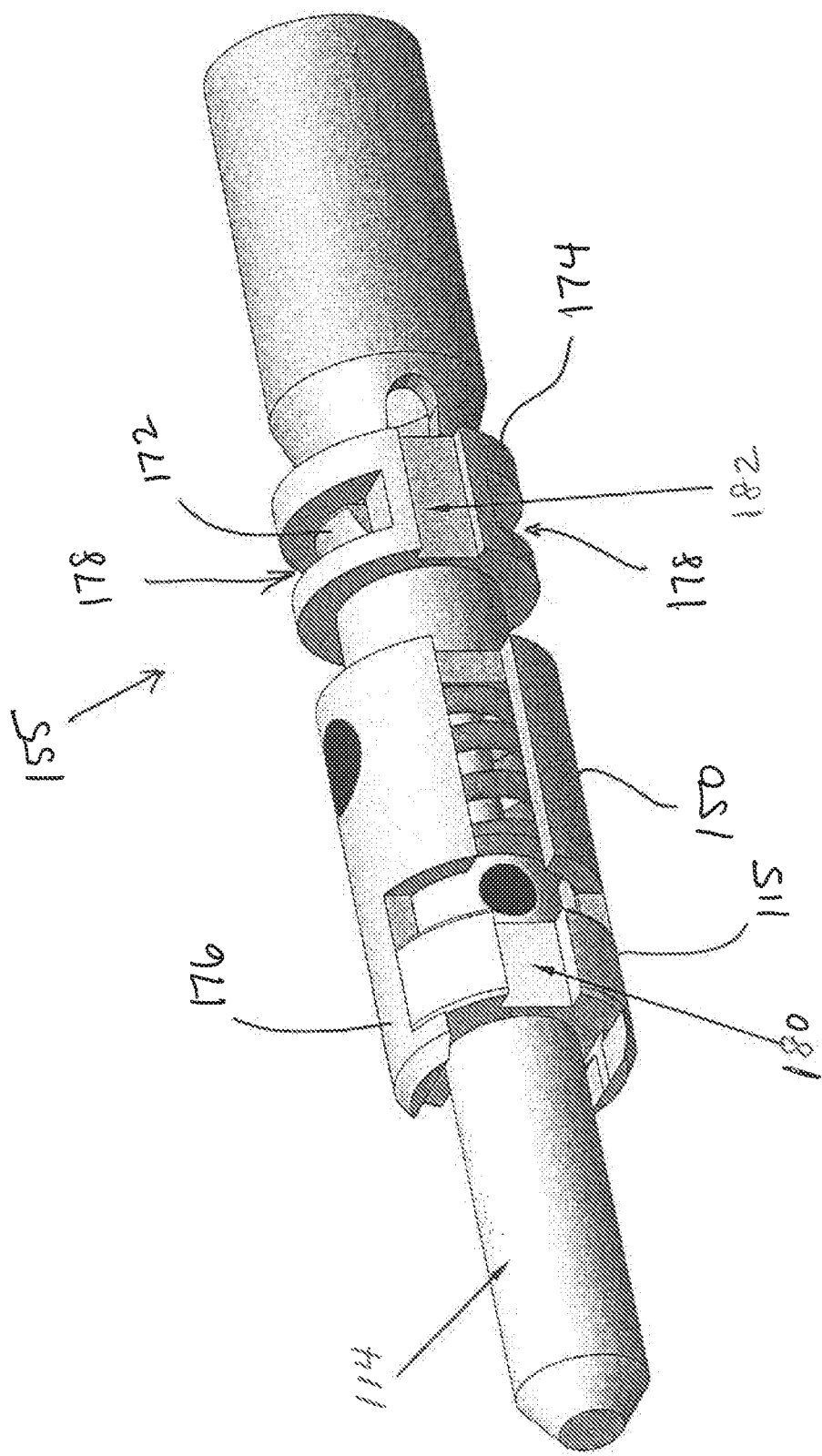
FIG. 9 is a perspective view of the optical fiber connector sub-assembly of FIG. 4 when assembled.

As best illustrated in FIG. 9, the prongs 172 and the slots 178 are configured such that the sleeve 136 and the ferrule holder carrier 150 are rotatably fixed to one another (i.e., are not rotatable relative to one another) when the prongs 172 are inserted into the slots 178. The basket 176 and the collar 174 may also include longitudinal slots 180, 182 along the lengths of their outer surfaces that are keyed to projections 126 on an inner surface of the inner housing 120 to prevent the ferrule holder carrier 150 from rotating relative to the inner housing 120.

The ferrule holder 116 has a cylindrical stem 122 which extends in an axial direction away from the ferrule 114 towards the ferrule holder carrier 150 and the sleeve 136, which is used to make a crimp connection around the optical fiber cable sheathing 112. The spring 117 is seated around the stem 122 between an annular shoulder 124 on the ferrule holder 116 and a similar annular surface 152 within a cylindrical recess 154 of the ferrule holder carrier 150. The stem 120 is slidably seated in a closely fitting bore of the ferrule holder carrier 150.

During assembly, the ferrule holder 116 and seated ferrule 114 are inserted axially into the recess 154 of the ferule holder carrier 150. The carrier 150 has a pair of arms 156 around a portion of the stem 122 nearest the ferrule 114 which extend axially forwards of the stem on opposite sides of the base 115 of the ferrule holder 116. Two pairs of curved fingers 158 are provided, each pair extending in opposite circumferential directions at the end of each arm 156. The fingers 158 extend transversely to the length of the arms 156 partially around the circumference of a portion of the ferrule 114 nearest the base 115.

The ferrule base 115 has four cycles of crenellations 162 spaced symmetrically around the circumference of the base and which provide four corresponding channels that extend parallel to the optical fiber axis 105. These crenellations 162 are in the form of alternating radially high 165 and low 166 cylindrically shaped regions with the circumferential and axial extent of each of the high 165 and low 166 regions being the same. The high 165 and low 166 regions are separated by steps 167 that extend in a radial direction. The arms 156 are seated in opposite radially low regions 166 in a sliding fit with the adjacent high regions 165, and reach axially forward of the base 115 and crenellations 162 so that the fingers 158 engage with the intervening radially high regions 165 on a side 161 of the base 115 opposite the annular surface 124 against which the spring 117 is engaged.

The aforementioned arrangement permits a degree axial movement of the ferrule holder 150, with movement being therefore limited in one direction by the compression of the spring 117 between the two annular surfaces 124, 152 and in the other axial direction by the contact of the fingers 158 with the radially high regions 165 of the crenellations 162 on the base 115 of the ferrule holder 116. As can be seen from the drawings, the ferrule holder base 115 and ferrule holder carrier 150 also have a common cylindrical outer envelope.

The inner housing 120 has a forward portion 130 that coaxially extends around the axially projecting ferrule 114 to define a receptacle 132 for a socket (not shown) to receive a projecting portion of the ferrule 114.

The ferrule holder 116 is free to move backwards inside the ferrule holder carrier 150 and the inner housing 120 when an end face 134 of the ferrule 114 comes into contact with a similar end face (not shown) of another optical fiber ferrule when making an optical connection.

The ferrule holder carrier 150 has a central aperture (not shown) through which the optical fiber 108 and buffering 110 pass, and has in a rear-most portion the sleeve 136 configured to receive and be crimped to the cable sheathing 112. In some aspects, a strain-relief sleeve 138, for example, a boot, may be provided around the junction of the optical fiber cable 102 and the ferrule housing sub-assembly 104.

An outer housing 140 is press-fitted axially over the assembled ferrule housing sub-assembly 104. Once the inner housing 120 and outer housing 140 are engaged together, the inner and outer housings are relatively moveable with respect to each other along the ferrule axis 105 between limits defined by an interaction between the inner housing 120 and the outer housing 140 provided by projections 142 on a pair of opposite sides of the inner housing 120 and a pair of apertures 144 in the outer housing. The projections 142 and apertures 144 interact with sprung features inside a matching socket (not shown) to provide SC-style push/pull 146 engagement/disengagement configured to mate with an optical fiber socket.

The rotational orientation of the ferrule holder carrier 150 may be set at one of four orientations relative to the ferrule 114 in the ferrule holder 116 owing to the seating of the arms 156 in the crenellations. In this way, a first rotational key is provided between the ferrule holder 116 and the ferrule holder carrier 150 such that the ferrule holder 116 and the ferrule holder carrier 150 are rotatably fixed to one another (i.e., are not rotatable relative to one another).

The optical fiber 108 is therefore terminated in a sub-assembly referred to herein as an optical fiber connector sub-assembly 160. During assembly of the optical fiber connector sub-assembly 160, the arms 156 and the fingers 158, which each have a chamfered taper 164 on an inner forwards surface, flex outwardly over the base 115 of the ferrule holder 114 until the fingers 158 snap radially inwards into engagement with the forwards surface 161 of the ferrule holder base 115.

In both cases, the resulting optical fiber connector sub-assembly 160 is therefore mechanically whole or integral, both as regards the components forming the sub-assembly and as regards the mechanical connection of the sub-assembly to the optical fiber cable 102. The sub-assembly cannot come apart without first prizing the fingers 158 back over the ferule holder base 115. The ferrule holder carrier 150 has an outer diameter which is preferably no more than that of the widest portion of the ferrule holder 114, i.e. the ferrule holder base 115.

After the insertion has been performed, the assembly of the SC-type optical fiber connector is completed as follows. The inner housing 120 is inserted in an axial direction over the projecting ferrule 114 and surrounding ferrule holder carrier 150. The external shape of the inner housing 120 where this interacts with the outer housing 140 is the same as with conventional connectors. The outer housing 140 therefore is snap-fitted over the inner housing 120, after which the SC-type connector 101 is fully compatible with conventional connectors and conventional optical fiber sockets.

It should be noted that although the specific example described above relate to an SC-type connector, the optical fiber connector sub-assembly can be adapted for use with other types of optical fiber connector systems, for example the ST-type connectors.

The disclosure therefore provides a convenient optical fiber connector and optical fiber communication system and method for providing such a system.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An optical fiber connector sub-assembly for an optical fiber connector, comprising:
   a ferrule configured to hold an optical fiber therein along an axis of the connector;
   a ferrule holder configured to hold the ferrule at a front portion of the connector; and
   a ferrule holder carrier configured to hold the ferrule holder;
   a sleeve configured to be coupled with the ferrule holder carrier, the sleeve being disposed rearward of the ferrule holder carrier along the axis of the connector,
   wherein the sleeve and the ferrule holder carrier are configured to receive an optical fiber,
   wherein the ferrule is configured to terminate the optical fiber,
   wherein the ferrule holder and the ferrule holder carrier are configured to be rotatably fixed to one another,
   wherein the sleeve and the ferrule holder carrier are configured to articulate relative to one another to mechanically isolate the front portion of the connector from a rear portion of the connector such that the ferrule holder is isolated from movement of the rear portion of the connector, and
   wherein the sleeve and the ferrule holder carrier are configured to be rotatably fixed to one another.

2. The optical fiber connector sub-assembly of claim 1, wherein the sleeve includes a cylindrical portion and two prongs extending from a forward end of the cylindrical portion, and
   wherein the ferrule holder carrier includes a collar at a rearward end and a basket at a forward end, the collar including two slots that extend radially through the collar, each of the two slots extending about a portion of the circumference of the collar.

3. The optical fiber connector sub-assembly of claim 2, wherein the two prongs and the two slots are structured and arranged relative to one another such that the prongs are configured to snap into the slots.

4. The optical fiber connector sub-assembly of claim 2, wherein the prongs are configured to bend radially inward when being inserted into the slots and to return toward an unstressed configuration after being inserted into the slots.

5. The optical fiber connector sub-assembly of claim 2, wherein the sleeve and the ferrule holder carrier are configured to articulate relative to one another in an X-axis direction and a Y-axis direction that are perpendicular to each other and to the connector axis.

6. An optical fiber connector sub-assembly for an optical fiber connector, comprising:
   a ferrule holder configured to hold a ferrule at a front portion of the connector; and
   a ferrule holder carrier configured to hold the ferrule holder;
   a sleeve configured to be coupled with the ferrule holder carrier, the sleeve being disposed rearward of the ferrule holder carrier along an axis of the connector,
   wherein the sleeve and the ferrule holder carrier are configured to articulate relative to one another to mechanically isolate the front portion of the connector from a rear portion of the connector such that the ferrule holder is isolated from movement of the rear portion of the connector, and
   wherein the sleeve and the ferrule holder carrier are configured to be rotatably fixed to one another.

7. The optical fiber connector sub-assembly of claim 6, wherein the ferrule holder and the ferrule holder carrier are configured to move relative to one another along the connector axis between limits defined by an interaction between the ferrule holder carrier and the ferrule holder.

8. The optical fiber connector sub-assembly of claim 7, further comprising a spring provided between the ferrule holder and the ferrule holder carrier and configured to bias the ferrule away from the ferrule holder carrier along the connector axis.

9. The optical fiber connector sub-assembly of claim 8, wherein the base of the ferrule holder has a plurality of crenellations that extend circumferentially around the ferrule, the ferrule holder carrier having two arms that extend in an axial direction through the crenellations towards the ferrule, the two arms including a movement limitation feature configured to interact with the ferrule holder base to limit the relative movement of the ferrule holder and the ferrule holder carrier along one direction of movement along the ferrule axis.

10. A Subscriber Connection (SC)-type optical fiber connector comprising an optical fiber connector sub-assembly, an inner housing, and an outer housing, the connector sub-assembly being as claimed in claim 9,
   wherein the inner housing is configured to be fixedly connected to the ferrule holder carrier and to define a receptacle for a socket to receive a projecting portion of the ferrule;
   wherein the spring provided between the ferrule holder and the ferrule holder carrier is configured such that the projecting portion of the ferrule is spring biased along the connector axis towards the receptacle of the inner housing; and
   wherein the inner housing is configured to be engaged within the outer housing, the inner housing and the outer housing being configured to move relative to each other along the connector axis between limits defined by an interaction between the inner housing and the outer housing in order to provide SC-style push/pull engagement/disengagement with a mating optical fiber socket.

11. The SC-type optical fiber connector of claim 10, wherein the ferrule is configured to be rotationally fixed with respect to the ferrule holder about the connector axis, and
   wherein the ferrule holder is configured to be rotationally aligned with respect to the outer housing so that the rotational orientation of the ferrule with respect to the outer housing can be set during assembly of the connector at one of one or more predefined rotational orientations.

12. The SC-type optical fiber connector of claim 11, wherein a first rotational key is provided between the ferrule holder and the ferrule holder carrier and a second rotational key is provided between the ferrule holder carrier and the inner housing.

13. The optical fiber connector sub-assembly of claim 6, wherein outermost surfaces of the ferrule holder carrier and the ferrule holder, relative to the connector axis, lie on a common cylindrical envelope.

14. An optical fiber connector sub-assembly for an optical fiber connector, comprising:
   a gimbal including a ferrule holder carrier configured to hold the ferrule and a sleeve disposed rearward of the ferrule holder carrier along an axis of the connector, the gimbal being configured to hold a ferrule at a front portion of the connector,
   wherein the gimbal is configured to provide articulated relative movement between the front portion of the connector and a rear portion of the connector such that the ferrule is isolated from movement of the rear portion of the connector, and
   wherein the sleeve and the ferrule holder carrier are configured to be rotatably fixed to one another.

15. The optical fiber connector sub-assembly of claim 14, wherein the sleeve and the ferrule holder carrier are configured to articulate relative to one another to mechanically isolate the front portion of the connector from a rear portion of the connector.

16. The optical fiber connector sub-assembly of claim 15, wherein the sleeve and the ferrule holder carrier are configured to articulate relative to one another in an X-axis direction and a Y-axis direction that are perpendicular to each other and to the connector axis.

17. The optical fiber connector sub-assembly of claim 16, further comprising a ferrule holder configured to hold the ferrule,
   wherein the ferrule holder carrier is configured to hold the ferrule holder, and
   wherein ferrule holder and the ferrule holder carrier are configured to move relative to one another along the connector axis between limits defined by an interaction between the ferrule holder carrier and the ferrule holder.

18. A Subscriber Connection (SC)-type optical fiber connector comprising an optical fiber connector sub-assembly, an inner housing, and an outer housing, the connector sub-assembly being as claimed in claim 17,
   wherein the inner housing is configured to be fixedly connected to the ferrule holder carrier and to define a receptacle for a socket to receive a projecting portion of the ferrule; and
   wherein the inner housing is configured to be engaged within the outer housing, the inner housing and the outer housing being configured to move relative to each other along the connector axis between limits defined by an interaction between the inner housing and the outer housing in order to provide SC-style push/pull engagement/disengagement with a mating optical fiber socket.

19. The SC-type optical fiber connector of claim 18, wherein the ferrule is configured to be rotationally fixed with respect to the ferrule holder about the connector axis, and
   wherein the ferrule holder is configured to be rotationally aligned with respect to the outer housing so that the rotational orientation of the ferrule with respect to the outer housing can be set during assembly of the connector at one of one or more predefined rotational orientations.

20. The SC-type optical fiber connector of claim 19, wherein a first rotational key is provided between the ferrule holder and the ferrule holder carrier and a second rotational key is provided between the ferrule holder carrier and the inner housing.

* * * * *